Sept. 22, 1959   W. I. EVANS ET AL   2,905,212
MORTISING MACHINE
Filed Oct. 7, 1957   2 Sheets-Sheet 1

WILLIAM I. EVANS,
ELIAS BLANCO,
INVENTORS.

BY
ATTORNEY

Sept. 22, 1959   W. I. EVANS ET AL   2,905,212
MORTISING MACHINE
Filed Oct. 7, 1957   2 Sheets-Sheet 2

WILLIAM I. EVANS,
ELIAS BLANCO,
       INVENTORS.

BY
       ATTORNEY

.# United States Patent Office 2,905,212
Patented Sept. 22, 1959

2,905,212

MORTISING MACHINE

William I. Evans, Downey, and Elias Blanco,
Los Angeles, Calif.

Application October 7, 1957, Serial No. 688,762

7 Claims. (Cl. 144—3)

This invention relates to a system for forming special mortises in material, particularly wood, which provides clean edges and accurate dimensions at all times.

In our Patent No. 2,464,743, of March 15, 1949, a method of making a joint between two elements is described and claimed. In Witte Patent No. 2,596,320, of March 31, 1952, assigned to us, a container or frame construction utilizing the joint of Patent No. 2,464,743 is disclosed and claimed. In our application, Ser. No. 484,893, filed January 31, 1955, a semi-automatic machine for making the special mortises is disclosed and claimed.

The novel joint requires a special mortise in which a cylindrical portion has an internal surface extending for an angular distance of over 180 degrees along with the provision of a shoulder formed by a larger portion at the end of the cylindrical portion in which the end of a locking spindle is positioned. The spindle itself has an exterior cylindrical surface extending for an angular distance of over 180 degrees and substantially the same as the internal surface of the cylindrical portion of the mortise, and a flange for the larger portion of the mortise for preventing longitudinal movement of the spindle. Since the spindle is not a complete round, one cross-sectional dimension thereof is less than the width of the opening into the cylindrical mortise. The spindle is thus inserted in the mortise with the axis of the spindle and mortise parallel, the spindle then being turned approximately 90 degrees. Since the opening of the mortise is less than the diameter of the spindle, the spindle is held in the mortise against lateral movement thereof, while the shoulder or flange of the spindle prevents longitudinal movement in the mortise. Thus, it is essential that the cylindrical portion of the mortise be uniform in cross section throughout its length and the edges of the opening clean and sharp.

In the formation of the cylindrical portion of the mortise, it was found difficult to prevent movement of the drill from a straight line, the end of the drill having a tendency to move toward the opening in the mortise. Furthermore, a wandering drill did not keep the edges of the mortise sharp and clean so as to eliminate cracks which would fracture later. The present invention avoids these difficulties while increasing the life of the drill by a burnishing action. The drill is also kept cooler than formerly, while the jig has a reversible bushing permitting it to be reversed in the event of wear in the guiding groove.

The principal object of the invention, therefore, is to facilitate the forming of a special mortise used in the joining of two elements.

Another object of the invention is to provide an improved jig for drilling special mortises with cylindrical portions having a constant width open edge.

A further object of the invention is to provide a combination of jig and drill which will cut special mortises with sharp and clean edges and of uniform size.

A better understanding of this invention may be had from the following detailed description when read in connection with the accompanying drawings, in which.

Figure 1:
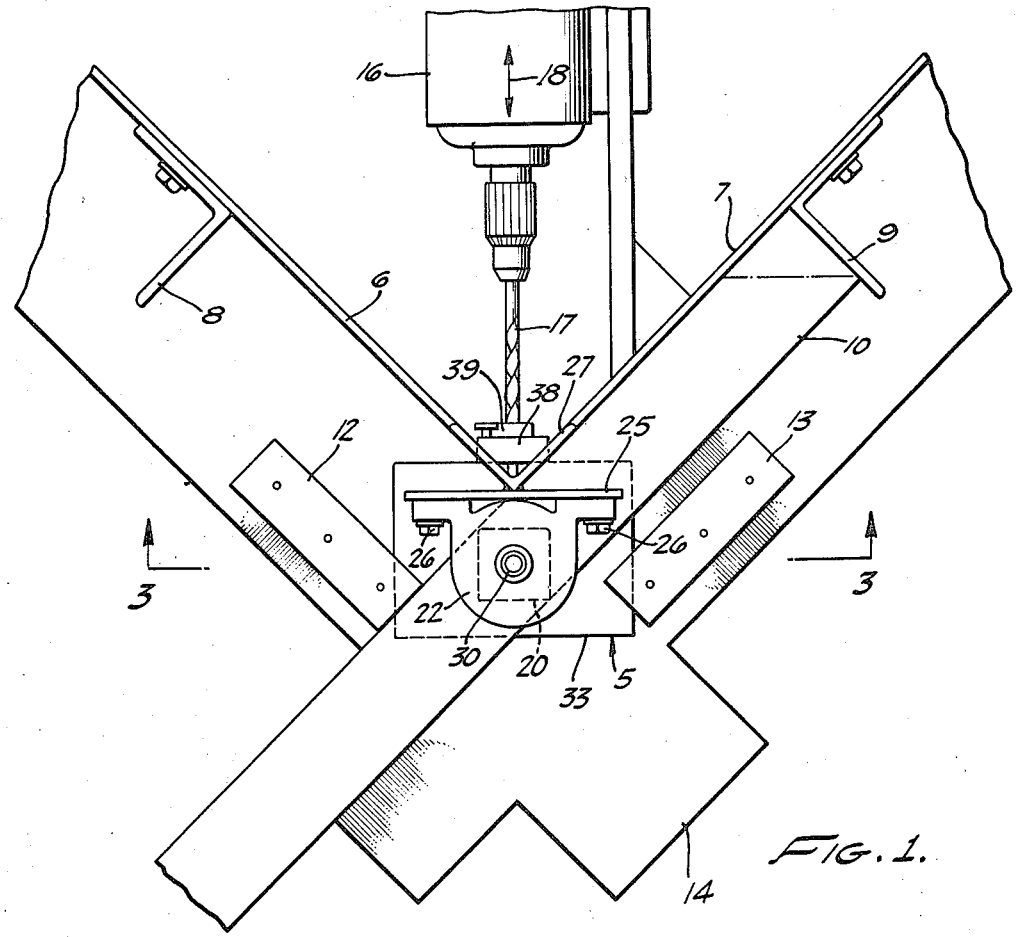
Fig. 1 is a plan view of a drill and jig combination embodying the invention.

Referring, now, to the drawings in which the same reference numerals identify like elements, a jig shown generally at 5 is supported on cross-frame members 6 and 7 having fixed stops 8 and 9, respectively, for longitudinally positioning a strip of material 10 with respect to the jig 5. Guide blocks 12 and 13 are fastened to a base plate 14 attached to the angle members 6 and 7.

A drill motor 16 having a drill 17 is positioned for axial movement as shown by the arrow 18 toward and away rfom the jig 5.

Figure 3:
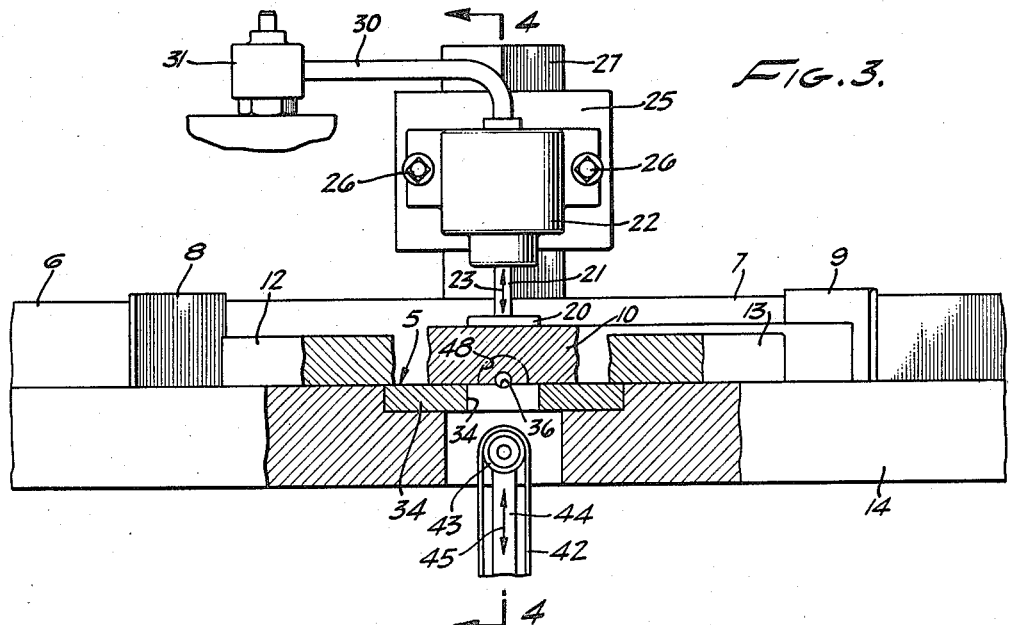
Fig. 3 is a cross-sectional view taken along the line 3—3 of Fig. 1.
Figure 4:
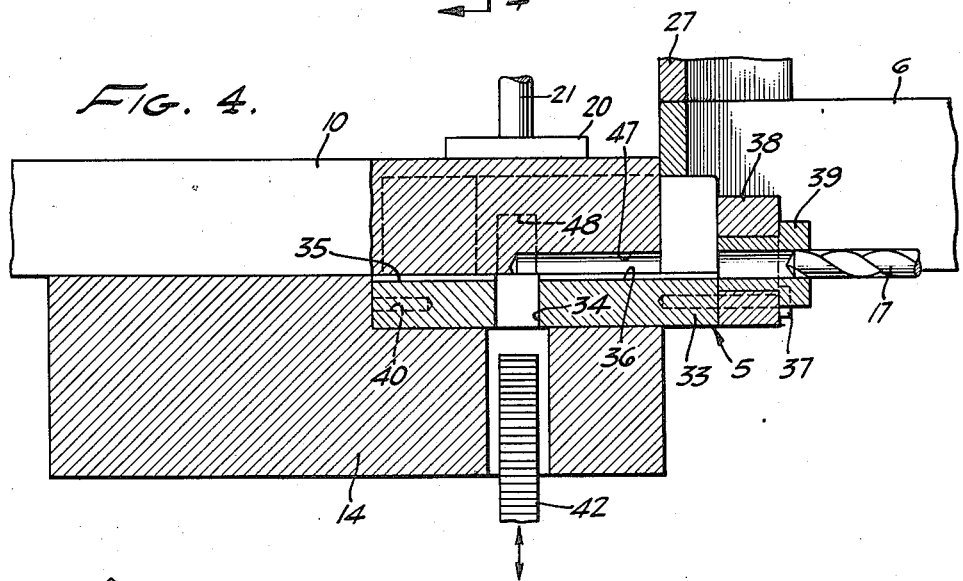
Fig. 4 is a cross-sectional view taken along the line 4—4 of Fig. 3.

To hold the strip 10 in position against either stop 8 or stop 9 on the plate 14, a hydraulic unit is employed having a pressure foot 20 mounted on a piston rod 21 actuated by a hydraulic piston in a cylinder 22, the cylinder being mounted on a base plate 25 by bolts 26 attached to an angular support 27 (see Fig. 3). The rod 21 is movable axially in both directions as indicated by the arrow 23. Air is supplied to the cylinder 22 in a conduit 30 controlled by a valve 31.

Figure 2:
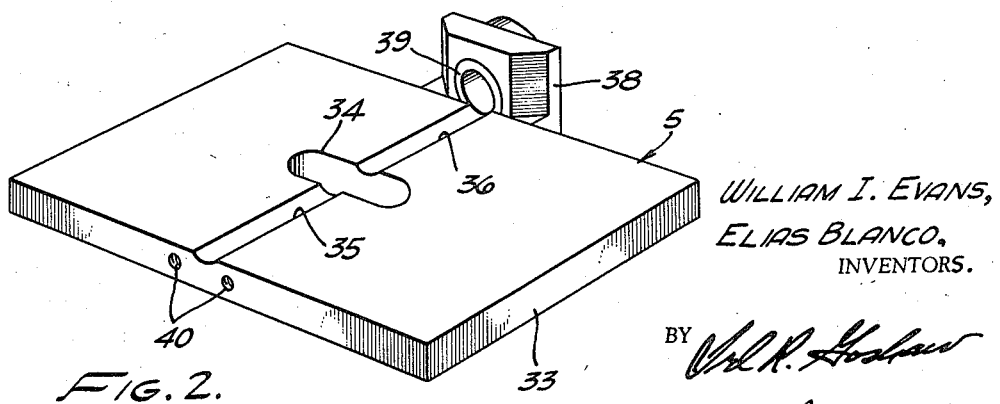
Fig. 2 is a perspective view of the jig used in the combination shown in Fig. 1.

The jig 5 is formed from a base plate 33 having an elongated slot 34 at the center thereof and a groove 35 on one side of the slot and a groove 36 on the other side of the slot. The radius of curvature of these grooves is substantially the same as the radius of drill 17. The plate 33 is of hard metal. Attached to the edge of the plate 33 by bolts, such as shown at 37, is a bushing support 38 in which is a bushing 39, the plate and bushing also being mountable on the other edge of the plate as indicated by the bolt holes 40 (see Fig. 2). As indicated in the plan view of Fig. 1, the stock or material to be mortised is at an angle to the axis of the drill 17, the axis of the drill 17 being coincident with the axis of the grooves 35 and 36 and the bushing 39.

Also mounted below the angle plates 6 and 7 is a mortise chain 42 which passes over a roller 43 and a lower sprocket drive roller not shown, the mortise chain being movable axially along with its roller and drive support 44, as shown by the arrow 45. The movements of the drill motor 16 and drill 17, the actuation of valve 31, and the movement of the mortise chain may be controlled by either hand or foot levers.

Figure 5:
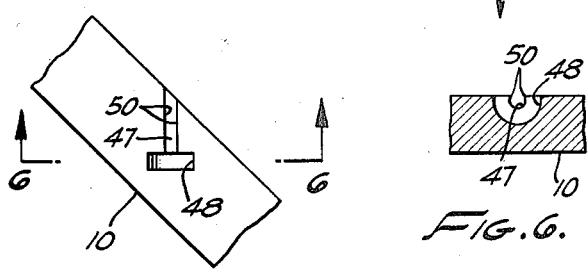
Fig. 5 is a plan view showing the special mortise.
Figure 6:
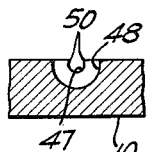
Fig. 6 is a cross-sectional view taken along the line 6—6 of Fig. 5.

To explain the operation of producing a special mortise such as shown in Figs. 5 and 6, the cylindrical portion 47 of the mortise is formed by the drill 17 passing through and being guided by the bushing 39 and also by groove 36. When the drill has produced the cylindrical mortise 47, it is removed and the mortise chain is then raised through the slot 34 and the large end portion 48 of the mortise is formed. During the operation of the drill and mortise chain, the stock or strip 10 is held fixed on the plate 33 by the foot 20.

The particular arrangement of drill, mortise chain, and jig 5 provides a mortise in material, such as wood, which is always uniform in cross section and has sharp and clean edges 50. This prevents cracks which later fracture. The bushing 39 and the hard metal grooves 35 and 36 maintain the axis of the drill in a straight line at all times during the drilling operation. The bushing is replaceable whenever excessive wear is produced. Also, the bushing 39 may be attached to the other edge of the plate 33 whenever the groove 36 shows excessive wear, the plate being rotated 180 degrees.

A hard steel groove, as shown at 35 and 36, also prolongs the life of the drill by its burnishing effect while holding the cutting edges of the drill within its cylindrical boundary. It is well known that in wood drills any reduced pressure on one side of the drill will tend to permit the drill to be led in that direction. Furthermore, the metal jig plate 33 will conduct heat from the drill, keeping the drill cool during the drilling operation. Mortises on either side of the stock 10 may be made by simply placing the stock against either stop 8 or stop 9.

We claim:

1. A mortise forming system comprising a drill, a jig attachable to said drill, a base plate for said jig and at a right angle thereto, means on said jig for holding material in which said mortise is formed against said plate, a partially cylindrical groove in said jig having a radius of curvature comparable to the radius of said drill, a bushing coaxial with said groove and mounted at the end of the groove in said plate, said bushing and groove being adapted to guide said drill, said drill forming one portion of a partially cylindrical mortise in the side of said material on said plate, the groove and mortise completing a cylindrical borelike formation, and a saw adapted to be moved through said jig and into said material to form another transverse portion of said mortise.

2. A mortise forming system in accordance with claim 1 in which said plate has an elongated slot substantially at the center thereof through which said saw is movable, said groove extending on both sides of said slot.

3. A mortise forming system in accordance with claim 2 in which said bushing is attachable to said plate at the outer end of each section of said groove.

4. A jig comprising a base plate, said plate having a partially cylindrical rectilinear groove extending across said plate and an elongated slot separating said groove into two sections, a bushing, and means for attaching said bushing to said plate at the outer end coaxial with said sections of said groove, said bushing and said groove being adapted to guide a drill in material held on said plate to form a partially cylindrical mortise therein, said slot being adapted to have a cutting tool moved therethrough into material held on said plate.

5. A jig in accordance with claim 4 in which said base plate is of hard metal.

6. A mortising machine comprising two members substantially at right angles to one another for supporting material to be mortised with a partially cylindrical mortise, means for predetermining the position of said material on said members to determine the position of said mortise in said material, means for firmly holding said material in said predetermined position, a drill adapted to enter said material at the intersection of said supporting members to form one portion of said mortise, a plate at said intersection and having a side parallel with said drill, said plate having a partially cylindrical groove therein, said groove having a radius of curvature comparable to the radius of said drill, said groove and mortise completing a cylindrical borelike formation, and a bushing coaxial with said groove attached to said plate at the end of said groove.

7. A mortising machine in accordance with claim 6 in which said plate has an elongated slot substantially at the center thereof, and a saw movable through said slot and into said material to form another transverse portion of said mortise.

References Cited in the file of this patent

UNITED STATES PATENTS

| | | |
|---|---|---|
| 313,198 | Gaylord | Mar. 3, 1885 |
| 629,787 | Greenleaf | Aug. 1, 1899 |
| 646,125 | Meserve | Mar. 27, 1900 |
| 1,385,227 | Oyron | July 19, 1921 |
| 2,464,743 | Evans et al. | Mar. 15, 1949 |
| 2,596,320 | Witte | May 13, 1952 |
| 2,597,152 | Kornmayer | May 20, 1952 |
| 2,645,255 | Francescatti, et al. | July 14, 1953 |